Patented Oct. 18, 1932

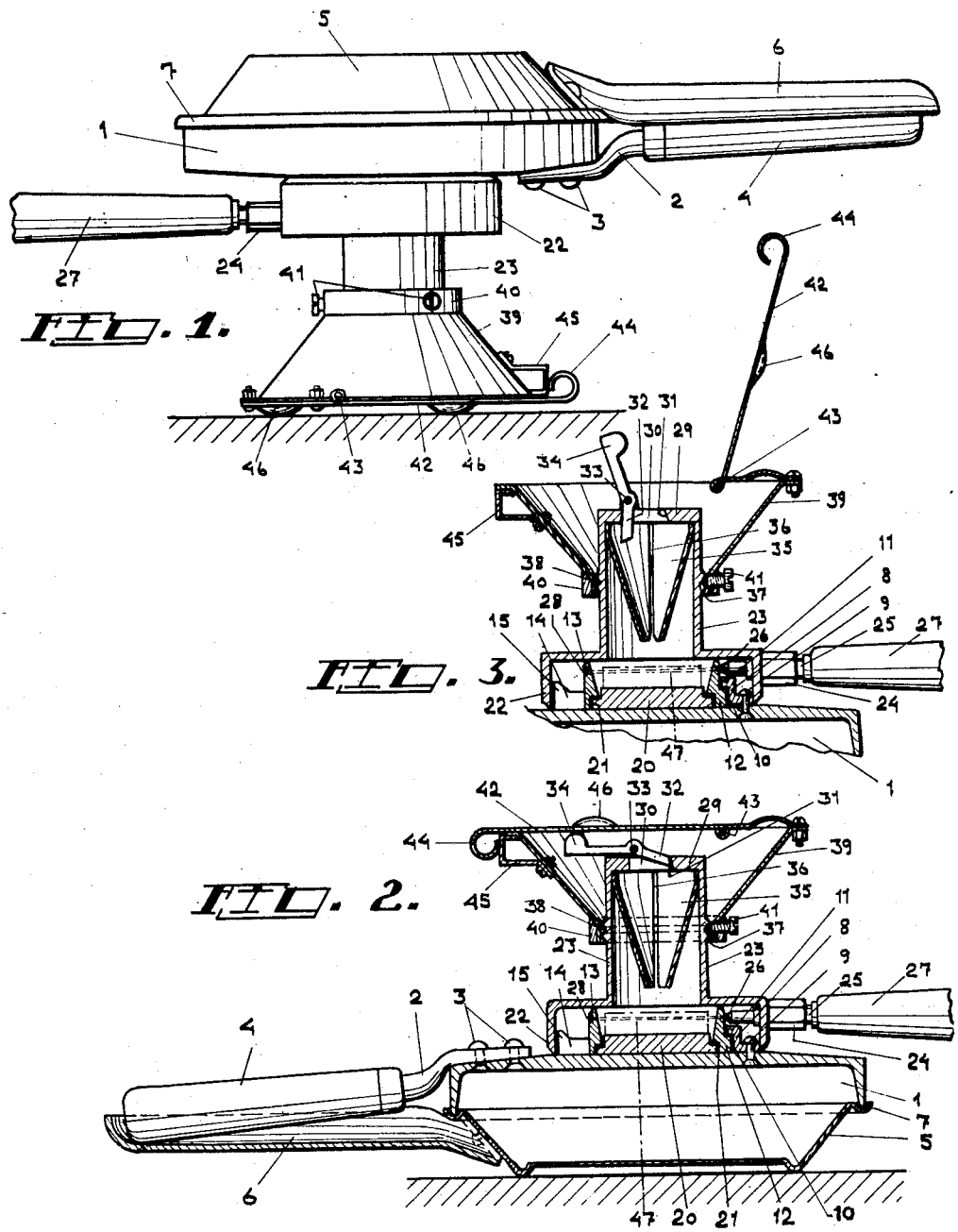

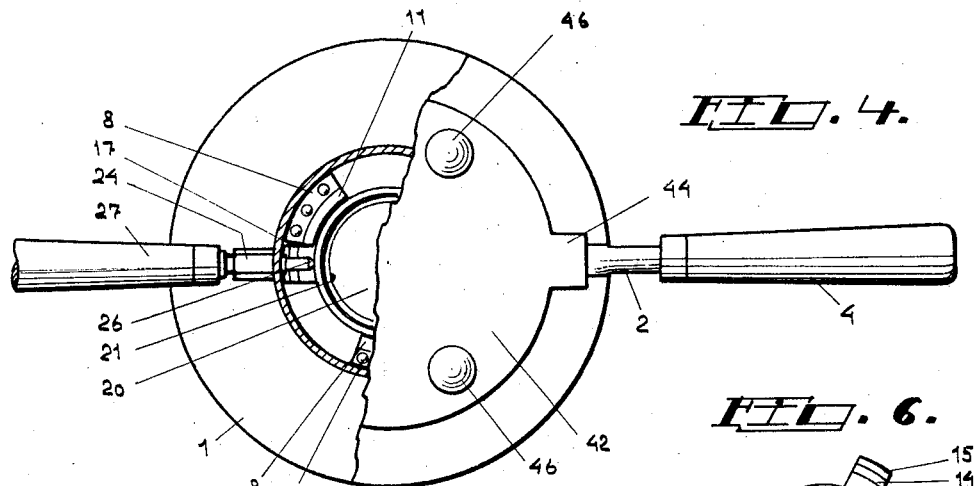
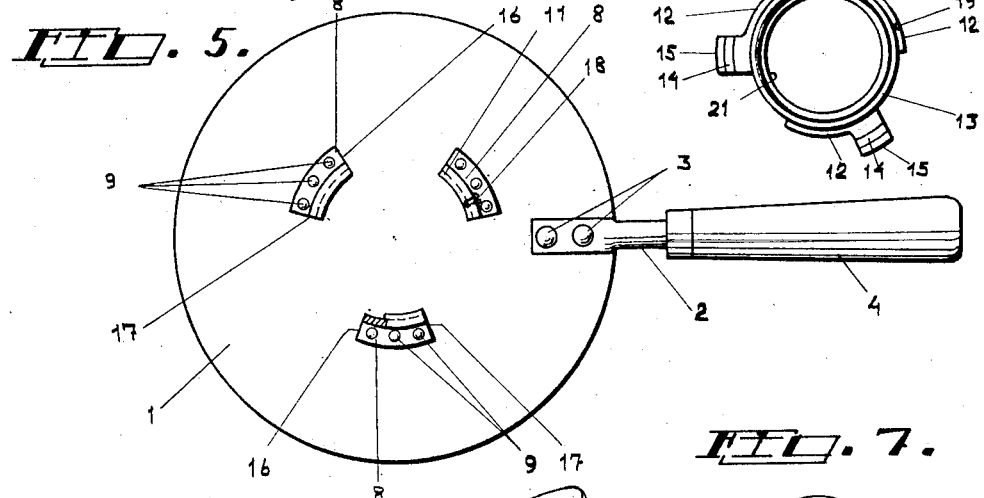
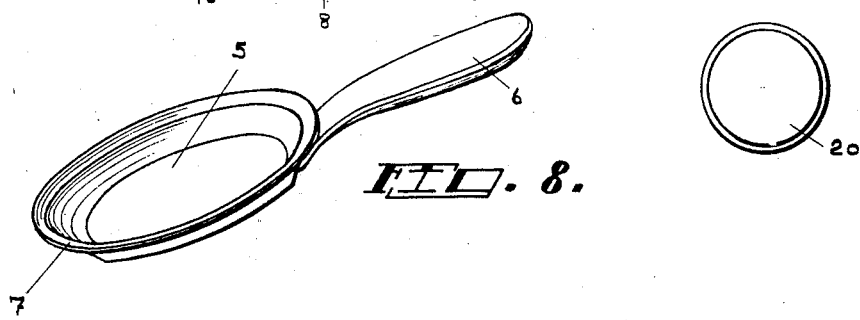

1,882,670

UNITED STATES PATENT OFFICE

MAGNUS MELLGREN, OF GOTTENBORG, SWEDEN

FRYING PAN

Application filed August 25, 1930. Serial No. 477,735.

This invention refers itself to frying pans and especially to that class of frying pans which are heated by the application in close contact to the pan, of a heat evolving cartridge.

The main object of this invention is a frying pan of the class mentioned which will be very handy to use in camping or in yachting, ensuring a quick, reliable and clean heating of the pan not influenced by hard wind or heavy rain.

Another object of my invention is a frying pan of the said class which can be furnished with one or more additional heating cartridges even when the food remains in the pan, should the initially furnished cartridge not suffice to give the final heat.

A further object of the invention is means to protect the pan proper from undue stresses caused by the very high heat evolved from the cartridge.

Still an object of this invention is means to effectively prevent glowing sparks or other particles from the burning cartridge to be thrown out.

Further features of my invention and how the same is to be carried out will be clearly understood by the following description in view of the annexed drawings in which a preferable embodiment of my invention is illustrated.

In the drawings

Fig. 1 is a side elevation view of the apparatus when in position to be utilized for frying.

Fig. 2 is a sectional elevation view of the apparatus in converted position showing diagrammatically the heat evolving cartridge applied.

Fig. 3 is a portion of the sectional view in Fig. 2 showing the two lids for the cartridge space opened for the ignition of the cartridge.

Fig. 4 is a partly broken plan view of the apparatus viewed from below.

Fig. 5 is a partially broken plan view of the pan proper viewed from below, all accessory parts being removed.

Fig. 6 is a plan view of the removed cartridge housing.

Fig. 7 is a plan view of the removable copper bottom of said housing, and

Fig. 8 is a perspective view of the removable pan cover in position to be utilized as a dining plate.

Experience has shown that when using heat evolving cartridges of the thermite type such a considerable heat will be emanated from the burning cartridge that it suffices for requisite frying of an ordinary quantity of some usual flesh food such as cutlets or the like. The same experience, however, has taught that the evolved heat will be so intense that ordinary wrought or cast iron does not withstand the melting effect but will be burnt through. This phenomena evidently depends upon the comparatively low heat transmitting effect of iron, resulting therein that the heat when evolved acts upon the rather narrow space of the pan where it is emitted, and bearing in mind that the temperature produced by the burning thermite cartridge arises to some 3,000° centigrade, it is evident that the iron will melt. As a conclusion, only such metals are apt to be used which have a high heat transmitting effect, and amongst them rolled aluminium is the most practical one in consideration of its commercial price and other qualifications. However, rolled aluminium has somewhat the double thermal expansion of iron so that an aluminium frying pan of this class cannot be tightly riveted to iron parts or otherwise tightly assembled to such parts because the considerable difference in expansion of aluminium and iron will cause the joints between them to be slackened breaking one part or the other.

One of the earnest problems to be solved, thus, is to design the joints in such a way that the various parts have a free play independent of one another when heated.

Another important point is the accessibility of the various parts to ensure a thorough cleaning from ash, cinders and slag. This problem has been solved by my improved pan thereby that all parts are designed such that they easily can be taken apart either directly by hand or with the only aid of a screw driver or an adequate simple implement.

With these and similar points of view my improved frying pan consists in the pan 1 proper made of rolled aluminium and having substantially the appearance of a common frying pan with a flat bottom and a handle 2 secured to said bottom by rivets 3 and provided with a wooden grip 4. The pan can be temporarily covered by a shelter 5 which preferably is made in the form of a converted dining plate with a handle 6 that is channel shaped so that it partially will embrace the grip 4 when the shelter covers the pan supported by the side walls thereof cooperating with an annular flange 7 of the shelter as shown in Fig. 1. In Fig. 8 the shelter 5 is illustrated in such a view that its character of dining plate is evident.

On the down side of the bottom the pan 1 is provided with three segmental jaws 8 disposed on a common circular line concentric to the circular pan 1 (Fig. 5) which jaws are secured to the pan by means of rivets 9. Each jaw 8 on its innerside is provided with a recess 10 terminated upwardly (in the converted position shown in Fig. 2) by a collar 11. In cooperation with three radially projecting cam sections 12 on the outer circumference of a shallow sleeve 13 said jaws form a bayonet joint securing the sleeve 13 removably to the bottom of pan 1. From the one end of each cam 12 an arm 14 projects radially terminating in a head 15. Said three arms have all the same length and the outwardly directed surfaces of the three arm heads 15 are turned after a cylindric surface concentric to the pan 1 and the jaws 8.

The arms 14 act as stoppers and guides for the sleeve 13 when assembled with the jaws 8 so that the sleeve 13 can be applied within the jaws only in a certain position with the arms 14 guided by the one end surface 16 of the respective jaws 8, and afterwards turned so far that the cams 12 enter the respective recesses 10, whereby the turning of the sleeve 13 is stopped when turned so far that the arms 14 contact the opposite end surface 17 of the respective jaws 8.

When in proper position the sleeve 13 is loosely secured to one of the jaws 8 by means of a set screw 18 the point of which enters a comparatively roomy excavation 19 in the outside of one of the cams 12. In this position the sleeve 13 is secured to the pan 1, so that it cannot be removed therefrom nonintentionally but owing to the spaciousness of the excavation 19 the attachment is not "tight" or "dead" but as well as the light passing of the cams 12 into the recesses 10 will allow some play sufficient to remove any risk for undue stresses between pan 1 and sleeve 13 when these parts expand unequal under heat.

The bottom of the sleeve 13, (the apparatus though in the converted position shown in Fig. 2) consists of a circular copper disk 20 (Fig. 7) with stepped sides as clearly seen in Fig. 2. The widest portion of the disk 20 is housed within a circumferential recess 21 in the innerwall of the sleeve 13, so that the disk cannot be removed from its proper place in close contact with the bottom of pan 1 as long as the sleeve 13 is retained in position by the jaws 8. However, also the disk 20 does not fit exactly within the sleeve 13 but a little play must be present for the same reason as mentioned above.

Still assuming the converted position in Fig. 2 the space occupied by the sleeve 13 and the jaws 8 is covered by a casing composed of a stepped cylinder the lower portion 22 of which is wider than the upper portion 23. The first-mentioned cylinder portion 22 fits rather snugly the outer surfaces of the three arm heads 15 of the sleeve 13 nevertheless allowing some play for the aforesaid reason, and further it is of a height sufficient to enclose the sleeve 13. On the one side the cylinder portion 22 is provided with a radial spigot 24 with a screw threaded bore through which a screw threaded spindle 25 can be screwed in a horizontal direction towards the wall of the sleeve 13. Said spindle 25 terminates inwards the cylinder portion 22 in a point 26, and outwardly the spindle is provided with a handle 27. Registering with the point 26 there is a circumferential slot 28 in the wall of the sleeve 13 into which slot the point 26 will be forced when revolving the spindle with the handle 27, thus securing the stepped cylinder 22—23 to the pan with the handle 27 in any designed angular position in relation to the pan handle 2—4. In Figs. 1, 2 and 4 the two handles 27 and 2—4 are disposed diametrically opposed for the purposes which will be explained below, but that is only an arbitrary position, though for certain cases, a preferable position.

The contracted cylinder portion 23 equals a short pipe with a partially closed top portion 29 having a rectangular aperture 30 the one side 31 of which is tapered inwardly. Said aperture is closed by a lid 32 hinged on a pin 33 at the side of the aperture opposite the tapered side 31. The lid 32 has the character of a balance counter weighed by a bulb 34 on the free end so that in the converted position shown in Fig. 2 the lid automatically will be kept in closed position, whereby the edge of the lid cooperating with the tapered side 31 of the aperture 30 is cut off obliquely so as to make a tight fit with said tapered side.

The cylinder portion 23 contains a copper funnel 35, which is slit up along the one side at 36 and made somewhat yielding so that it will retain its proper position within the cylinder portion 23 when forced into it from the open wider cylinder portion 22.

On the outside the cylinder portion 23 is provided with a swell 37 with a circumferential slot 38. A funnel like cap 39 with a neck ring 40 at the narrower end surrounds the cylinder portion 23 to which it can be secured by means of three radially disposed set screws 41 with pointed ends screwed through the neck ring 40 and entering the slot 38. The cap 39 has a lid 42 hinged on a pin 43 and provided at the opposite edge with a yielding grip 44 cooperating with a yielding bow 45 on the outside of the cap 39. The top plate of the cap as well as its lid 42 are provided with some swells 46 which serve as supports when the apparatus is in the operative position shown in Fig. 1. In the last mentioned position the bulb weighed arm of the lid balance 32 is supported by the closed cap lid 42 so that the lid 32 will be kept closed.

The apparatus operates as follows.

When placed in the converted position shown in Fig. 2 the stepped cylinder 22—23 will be removed by unscrewing the spindle 25 with handle 27, and a heat evolving cartridge 27 illustrated in Fig. 2 by dotted lines is supplied within the sleeve 13 upon the copper disk 20. Now the stepped cylinder 22—23 is applied and locked by forcing the spindle point 26 into the slot 28. Having done that, the lids 42 and 32 are opened up as illustrated in Fig. 3, and an ignition match is dropped down through the aperture 30, and by the funnel 35 guided to the central ignition spot of the cartridge so that a safe ignition of same will occur.

Because of the fact that the ignition of the cartridge will be instantaneous it is very important that the lid 32 gets closed at once after dropping down the match, and that will be carried out automatically by the bulb 34, because of the weighted character of the lid, as soon as the lid is released. A sudden and immense heat will emanate from the burning cartridge 47, and owing to the composition of said cartridge and the instantaneous combustion glowing sparks of molten metal and such particles would be thrown out injuring the operator or the surroundings, should the lid 32 not make a tight joint. Hence the reason of the tapering of the cooperating parts of lid 32 and aperture 30. A further safety against such sparks is achieved by the outer lid 42 as also by the stepped cylinder 22—23 in toto.

Immediately after igniting the cartridge 47 and closing the lids 32 and 42, the apparatus must be converted into the active position according to Fig. 1, which will be very easily performed by seizing the apparatus with both hands, the one hand on the grip 4 and the other hand on the handle 27, whereby it is evident that the converting will be a very comfortable task, if the said two handles are disposed diametrically as mentioned above, because then the two handles operate as a continuous axis about which the apparatus has to revolve half a revolution. In the new position the apparatus will be supported by the small swells 46 on the cap 39 and its lid 42, and the food to be fried is supplied into the pan 1 as is usual when frying food.

Experience has taught that with a suitable heat evolving cartridge the heat supplied to the pan under ordinary circumstances will suffice to make ready the food. If for any reason, however, more heat is wanted, the operator only has to turn over the plate like shelter 5 with its channel shaped handle 6 coming upon the handle grip 4, after which he can seize the grip 4 and the handle 6 with one and the same hand, and the handle 27 with the other hand, and he converts the apparatus into the position in Fig. 2, placing the apparatus with the shelter 5 now serving as a foot. Now the above described operations for the supplying of a further cartridge 47 into the sleeve 13 and ignition of same as well as afterwards converting the apparatus into the active position in Fig. 1 will be iterated exactly as mentioned before provided that the shelter 5 is firmly retained on the pan by the same hand as holds the grip 4, and the frying can be continued.

The operative parts are so easy to manipulate that the above described iterated operations for burning an additional cartridge can be carried out almost as quickly as the said description is read.

When ready, the food can be brought on the table in the shelter 5 used as the dining plate.

From what is said above it is understood that the copper disk 20 will assist in the distributing of the heat to the aluminium pan 1 so that there will be no risk for an overheating and through burning of the pan. It is also easy to understand how conveniently the apparatus can be detached in all its parts and made accessible for cleaning and repair. The loose fits between all parts exposed to high temperatures remove all risks for undue stresses caused by different expansion ability.

The two handles 4 and 27 when positioned diametrically as a continuous axis make the apparatus well adapted to be used in yachts or other boats, because it can be suspended in said axis similar to a ship's compass, so that the pan will remain in a horizontal position notwithstanding the movements of the boat in the sea.

I do not limit myself to exclusively that embodiment shown in the drawings, as the design of the various parts and the mechanical assembling of them can be carried out in many varying forms though all within the scope of the following claims.

What I claim is:

1. In a frying pan, in combination, a pan of rolled metal, a housing for a heat evolving cartridge, said housing comprising a sleeve provided with a loosely fitted copper disk in direct contact with the bottom of the pan proper so as to make a protecting partition bottom between the pan and the heat evolving cartridge, said housing and said pan provided with cooperating easy detachable joints so that said housing with sufficient play can be removably attached to the pan, said joints also concealing said copper disk with requisite play within said housing, a casing provided with means to be easily atached to said pan covering said cartridge housing, said means designed so as to allow a sufficient play when the parts are heated, and means to reach the cartridge within said housing with an ignition means, whereby provisions are present to prevent glowing substances to be thrown out from said casing.

2. In a frying pan, in combination, a pan of rolled metal, a housing for a heat evolving cartridge, said housing comprising a sleeve provided with a loosely fitted copper disk in direct contact with the bottom of the pan proper so as to make a protecting partition bottom between the pan and the heat evolving cartridge, said housing and said pan provided with cooperating easy detachable joints so that said housing with sufficient play can be removably attached to the pan, said joints also concealing said copper disk with requisite play within said housing, a casing provided with means to be easily attached to said pan covering said cartridge housing, said means designed so as to allow a sufficient play when the parts are heated, a cap partially enclosing said casing, a lid in said cap, and a lid in said casing which lids cover apertures leading to the space for the heat evolving cartridge within said housing, whereby said lid for said casing is provided with means to be automatically closed and retained in closed position.

3. In a frying pan, means to burn a heat evolving cartridge in metallic contact with said pan, means to protect said cartridge when burning from throwing out glowing substances, means to prevent the different parts of which the apparatus is built up, from undue stresses caused by different expansion abilities when heated, said cartridge protecting means comprising a casing with an aperture leading to the space for the cartridge within said cartridge protecting casing, said aperture provided with an automatically closed lid, and means to guide an ignition match, supplied through said aperture, to the ignition spot of the cartridge within said casing.

4. A frying pan having jaws upon its bottom, a sleeve detachably engaged with the jaws, a heat dissipating disk confined loosely within the sleeve and in contact with the pan bottom, said sleeve being adapted to receive a heat involving cartridge, a casing detachably connected with the sleeve, and means carried by the casing for guiding an ignition element to the cartridge.

5. The combination with a frying pan, of a sleeve detachably connected with the bottom thereof adapted to receive a heat involving cartridge, a heat dissipating disk loosely confined within the sleeve and in contact with the pan bottom, a casing detachably engaged with the sleeve and having a closed top portion, said top portion having an aperture therein, means within the casing for guiding an ignition element passable through the aperture to engage the cartridge, and a closure for the aperture.

6. A frying pan having jaws upon its bottom, a sleeve detachably engaged with the jaws, a heat dissipating disk confined within the sleeve, said sleeve being adapted to receive therein a heat involving cartridge, said sleeve having an annular groove therein, a casing, a handle for the casing having a pointed member adapted to engage said grooves, and means carried by the casing to guide an ignition element to the cartridge.

7. A frying pan having jaws upon its bottom, a sleeve detachably and loosely engaged with the jaw, said sleeve being adapted to confine a heat involving cartridge, a heat dissipating disk loosely confined within the sleeve and engageable with the pan bottom, a casing detachably engaged with the sleeve and serving to retain the cartridge within the sleeve, and means within the casing for guiding an ignition element to the cartridge.

In testimony whereof I have affixed my signature.

MAGNUS MELLGREN.